United States Patent [19]

Jones, Jr.

[11] 3,800,592
[45] Apr. 2, 1974

[54] FLOWMETER

[75] Inventor: John J. Jones, Jr., Scituate, Mass.

[73] Assignee: J. H. Westerbeke Corporation, Boston, Mass.

[22] Filed: Jan. 13, 1972

[21] Appl. No.: 217,622

[52] U.S. Cl. .................................. 73/181, 73/204
[51] Int. Cl. ............................................ G01c 21/10
[58] Field of Search ........ 73/181, 204, 189; 324/95, 324/99

[56] References Cited
UNITED STATES PATENTS

| | | | |
|---|---|---|---|
| 3,400,582 | 9/1968 | Warner | 73/181 |
| 3,645,133 | 2/1972 | Simeth et al. | 73/204 |

Primary Examiner—Donald O. Woodiel

[57] ABSTRACT

A fluid flowmeter sensing element having a heat sensitive element, electrical heating means therefor and measuring means responsive to the current supplied to the heating means, and metallic support means having a smooth outer surface free from turbulence inducing irregularities. The support means carry the heat sensitive element and the heating means internally thereof in high thermal conductivity with the portion of the outer surface adjacent thereto. The support means, outwardly of that outer surface portion, have reduced thermal conductivity in the plane of the support for maintaining a temperature difference between that outer surface portion and portions outwardly thereof during heating thereof by the heating means.

1 Claim, 5 Drawing Figures

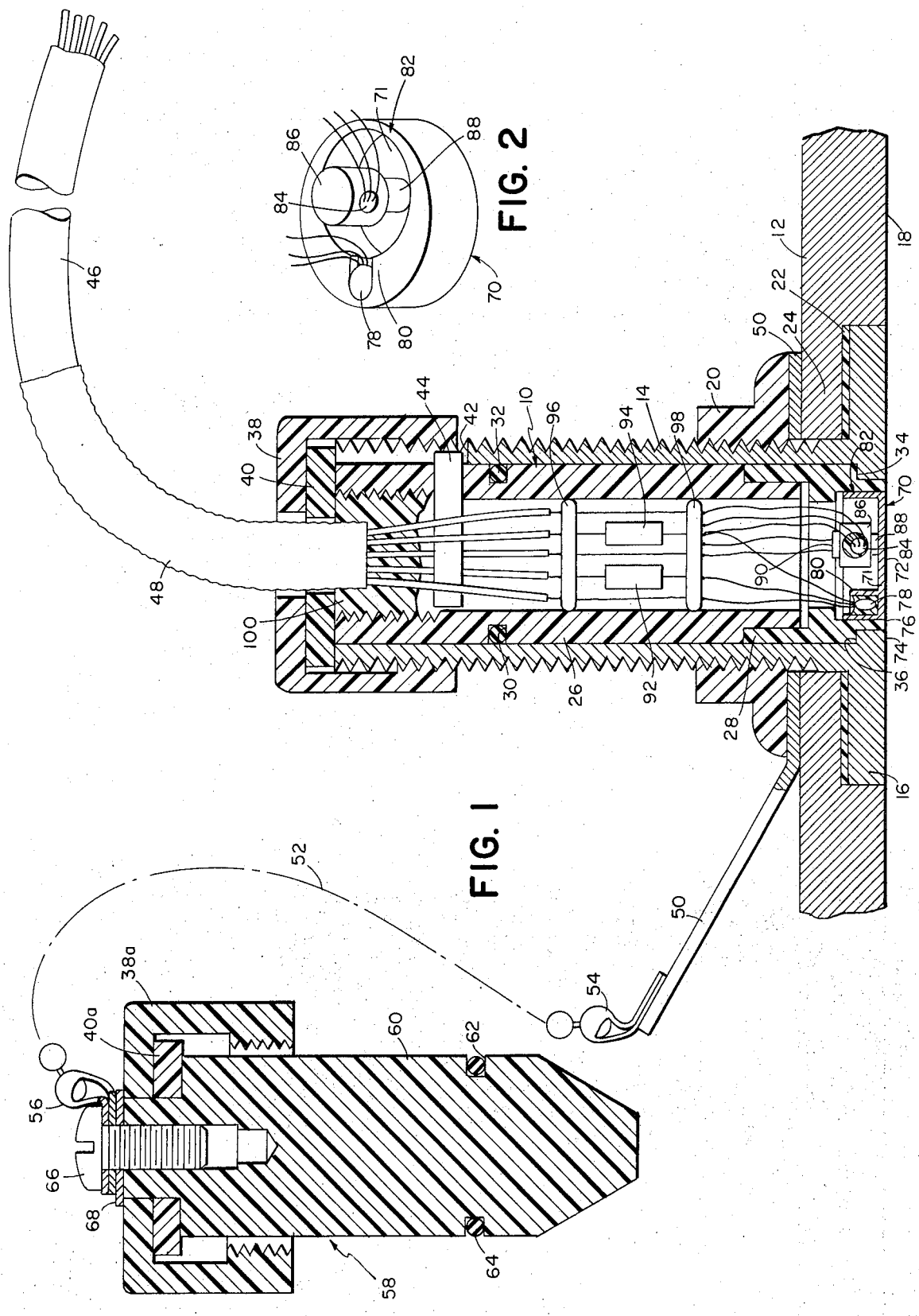

FLOWMETER

This invention relates to apparatus for measuring the relative velocity between a surface of a body and a fluid in contact with that surface.

Such apparatus is useful in a variety of situations including: as a flowmeter (where the surface is the inside of a channel in which the fluid is flowing) and as a boat speedometer (where the body is the hull of a boat moving through a body of water). While devices of this general variety have been known for some time, serious drawbacks have prevented their general acceptance or fullest utilization. These drawbacks have occurred for a number of reasons, principal among them being the failure to provide apparatus which will provide an accurate velocity reading when the ambient temperature of the fluid is not constant.

It is a principal object of the present invention to provide apparatus of the type described which provides for improved reliability of measurement in all circumstances, including when the temperature of the fluid changes.

It is a further object to provide such apparatus which will not affect the flow of the fluid relative to the surface of the body and which itself is not subject to fouling.

To achieve these and other objects, as will further appear, apparatus according to the invention for measuring the relative velocity between a surface of a body and fluid in contact therewith comprises a fluid flowmeter sensing element having a heat sensitive element, electrical heating means therefor, and measuring means responsive to the current supplied to the heating means. Metallic support means are provided which has a smooth outer surface free from turbulence inducing irregularities. The support means carries the heat sensitive element and the heating means internally thereof in high thermal conductivity with a portion of the outer surface adjacent thereto. The support means outwardly of that surface portion has reduced thermal conductivity in the plane of the support for maintaining a temperature difference between that surface portion and portions spaced apart therefrom during heating thereof by the heating means. Preferably, the heat sensitive element comprises a thermistor device and the fluid flowmeter has a compensating thermistor device also carried by the support means with the compensating thermistor spaced apart from the aforementioned outer surface portion in a location substantially unaffected by the heating means.

In another aspect of the invention, apparatus for measuring the relative velocity between a surface of a body and a fluid in contact therewith comprises a linear electrical bridge network having a thermally sensitive electrical device in one arm of the network. The device is in heat transfer relation with said fluid and a heater is disposed in heat transfer relation with respect to the device. A first feedback loop is provided to supply the heater with a voltage proportional to the voltage developed across the bridge, and to indicate the magnitude of that voltage. Preferably, the device comprises a thermistor and the bridge includes a second thermistor in heat transfer relation with respect to the fluid. A second feedback loop is preferably provided to supply the heater with a second voltage proportional to the voltage developed across the second thermistor.

Other objects, features, and advantages of the invention will appear from the following description of a preferred embodiment taken together with accompanying drawings. In the drawings:

FIG. 1 is a partially sectioned view of a probe portion of apparatus according to the invention mounted in the hull of a boat;

FIG. 2 is a perspective view of a portion of the probe of FIG. 1;

Figure 3:
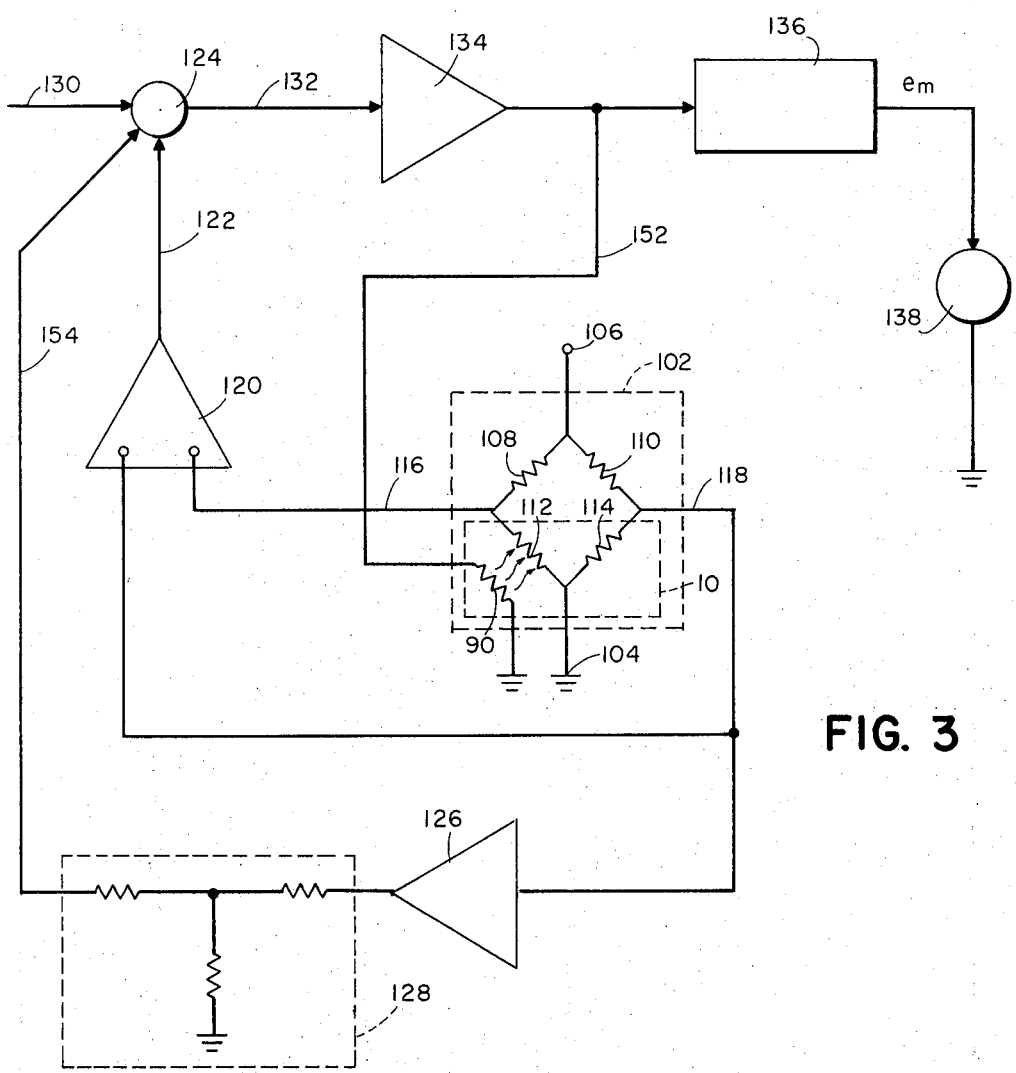
FIG. 3 is a block diagram of apparatus constructed according to the invention.

The sectional view of FIG. 1 illustrates the probe portion 10 of a flowmeter constructed according to the invention mounted in the hull 12 of a boat by means of throughhull fitting 14. A portion 24 of the hull 12 is clamped between flange 16 of the fitting 14 and nut 20. Fitting 14 has its outer surface 74 aligned with the outer surface 18 of the hull 12. Resilient seal 22 is compressed between flange 16 and the overlying portion 24 of hull 12.

The probe 10 comprises an upper housing 26 and a lower housing 28 which are cemented together. A recess 30 is provided in the cylindrical outer surface of housing portion 26 and a resilient seal 32 is provided in the recess. Annular shoulder 34 of lower housing portion 28 is maintained in contact with annular stop surface 36 of fitting 14 by means of downward force applied against housing portion 26 by cap nut 38 through resilient seal 40.

A longitudinally directed slot 42 is provided in the upper portion of cylindrical housing 14. A key 44 projects from upper housing portion 26 into slot 42. Cap nut 38 and seal 40 have central openings through which a cable 46 extends. A strain relief 48 is provided around the cable 46 in the region where the cable passes through nut 38 and seal 40.

Tab washer 50 is disposed around fitting 14 adjacent hull 12 and is retained by nut 20. Chain 52 is attached at its opposite ends to connector 54 on washer 50 and connector 56 of plug assembly 58. The plug assembly 58 includes cap nut 38a and seal 40a and a generally cylindrical plastic body 60 having a recess 62 in its surface. Resilient seal 64 is disposed in the recess 62. The body 60, cap nut 38a, and seal 40a are maintained as a unit by fastener 66 and washer 68.

Referring to FIGS. 1 and 2, a cup-like, non-fouling, cupro-nickel support member 70 is secured in lower housing portion 28 with its smooth outer surface 72 free from turbulence inducing irregularities and flush with outer surface 18 of hull 12, outer surface 74 of fitting 14, and outer surface 76 of housing portion 28. Thermistor 78 is in thermal contact with member 70 and is mounted in a recess in a widened portion 80 of annular flange 82 which is integral with the remainder of member 70. Thermistor 84 is mounted within copper block or mass 86. Lower portions 88 of copper mass 86 is in thermal contact (e.g., soldered) with member 70. Resistive heater 90 is mounted on copper block 86. Thermistors 78 and 84 are secured in their appropriate locations by means of a conventional thermally conductive adhesive.

Cable 46 contains a plurality (e.g., five) of individual conductors for connections within the probe in a manner described in detail below.

Resistors 92 and 94 are mounted between terminal discs 96 and 98.

The location of resistors 92 and 94 within the probe 10 allows cable 46 to have a minimum number of individual conductors (i.e., five). For ease of manufacture of the probe 10, however, it might be preferred to locate these resistors in an instrument panel with the remainder of the circuitry.

The hollow interior of te housing defined by portions 26 and 28 is entirely filled with epoxy 100.

A block diagram of the entire apparatus is shown in FIG. 3. The linear bridge network is indicated (but for heater 90) by box 102. Input terminal 104 of bridge 102 is grounded and a DC exitation potential of 2.4 volts is applied to input terminal 106. Resistors 108 and 110 each have a value of 3,200 ohms and are physically located in an instrument panel remote from the probe 10. The thermally sensitive elements 112 and 114 in the lower arms of the bridge 102 are identical to each other and each is actually three interconnected resistive elements. Two of these elements are thermistors connected in parallel and having values, respectively, of 30K ohms at 25°C and 6K ohms at 25°C. These pairs of thermistors may be identified with elements 78 and 84 of FIG. 1. The resistors 92, 94 of FIG. 1 are connected in series with the 6K ohm resistor of elements 114 and 112, respectively. Resistors 92 and 94 each have a value of 6,250 ohms. The resistive elements 112 and 114 and the heater 90 are the only actual circuit elements within the probe 10, indicated by broken line box 10 of FIG. 2.

The output from the bridge 102 appears on leads 116 and 118. This output is amplified by differential amplifier 120 and then fed on lead 122 to summing point 124. The signal on lead 118, which alone represents the voltage developed across resistive element 114, is fed to amplifier 126. The output from amplifier 126 is fed through resistive network 128 to the summing point 124. A signal is supplied to summing point 124 on lead 130 which is sufficient to produce the desired bridge 102 output at zero relative velocity between the surface and the fluid. The output from the summing point 124 is fed on lead 132 to amplifier 134. The output from amplifier 134 is fed both to heater 90 and unit 136 which comprises a linearizing circuit and a zero shifting circuit. The output from unit 136 is fed to meter 138.

Figure 4:
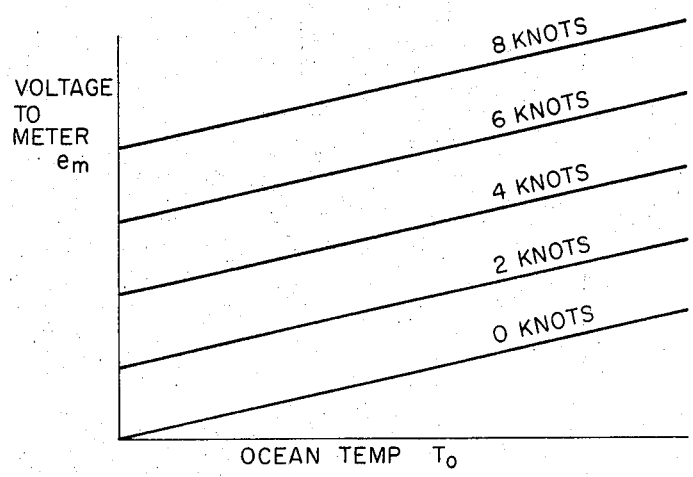
FIG. 4 is a graph illustrating the anomalous effect upon velocity measurements caused by changes in fluid temperature.
Figure 5:
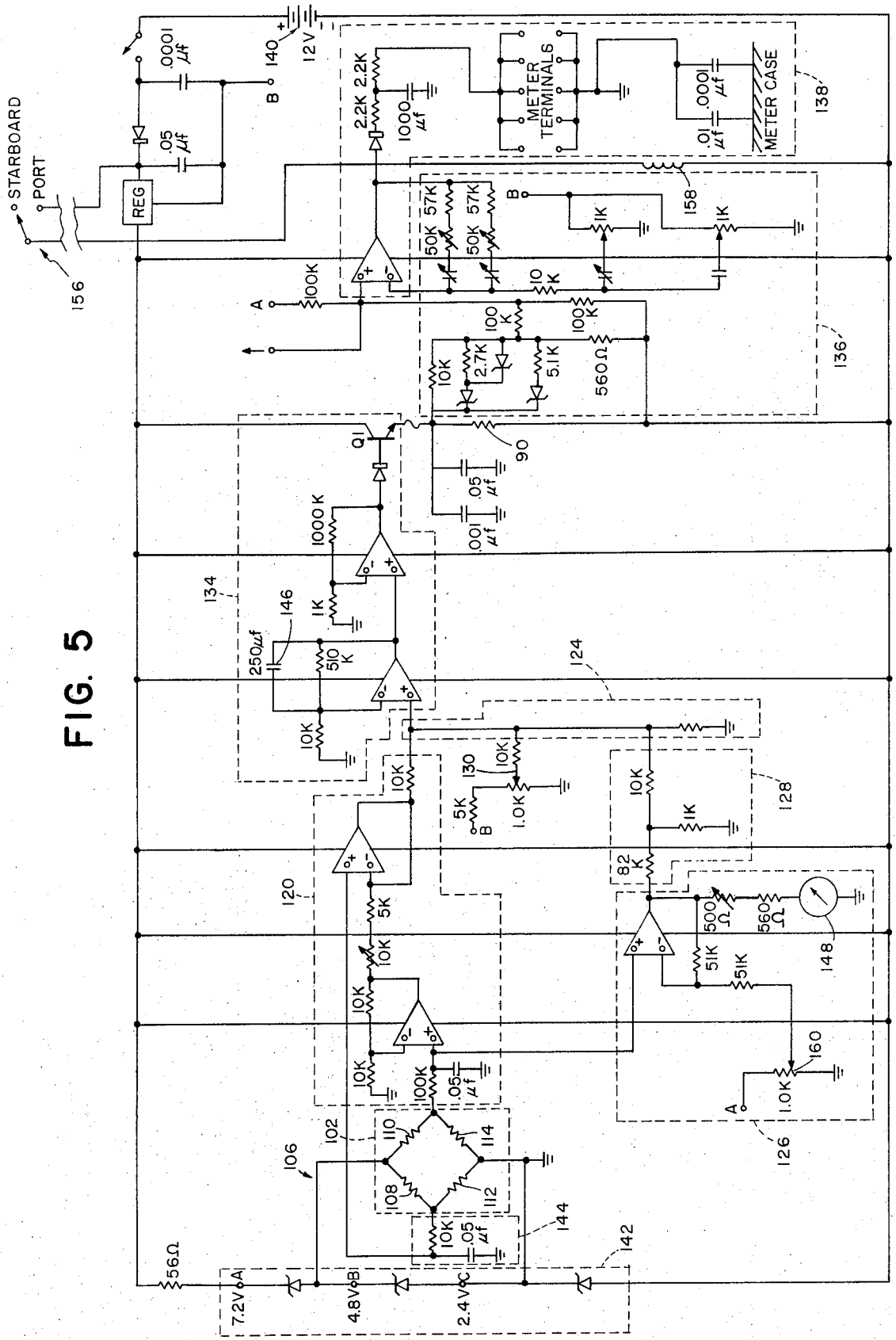
FIG. 5 is a circuit diagram for the apparatus of FIG. 3.

The circuit diagram corresponding to the block diagram of FIG. 2 is given in FIG. 4. In addition to units previously referred to and identified in FIG. 4, there is shown a 12 volt ship's battery 140, a voltage regulator 142 which provides 2.4 volts between points A and B and between points B and C, and rf filter 144. A power transistor $Q_1$ is provided at the output of amplifier 134. Phase compensating capacitor 146 is provided in the feedback loop of the first stage of amplification in amplifier 134. Meter 148 is provided at the output of amplifier 126 and given a direct reading of the fluid (i.e., ocean) temperature.

In operation a voltage (e.g., 2.4 volts in the embodiment shown in FIG. 4) is applied across the bridge 102. The input on lead 130 is adjusted to produce a predetermined output from the bridge on leads 116 and 118. This will correspond to a predetermined temperature difference (e.g., 5°F.) between the sensing thermistor 84 which is supplied with heat from the heater 90 and the reference thermistor 78 which is in excellent thermal contact with the fluid through the cupro-nickel member 70 and assumes the fluid temperature. This reference temperature difference is set when the vessel is stationary. With this setting, unit 136 may be adjusted to provide a zero velocity reading on the meter 138.

Both of the thermistor units, 78 and 84, are in good thermal contact with the fluid since the cupro-nickel member 70 is an excellent conductor of heat. Thus, but for anomalous effects discussed below, a change in the fluid temperature will affect both branches of the linear bridge 102 equally.

As the relative velocity between the fluid and the outer surface 18 of the boat hull 12 changes, the rate of heat loss from copper mass 86 and thermistor 84 through lower portion 88 and member 70 to the fluid will change, as is well known. This change will cause a change in the operating temperature of thermistor 84 and a consequent change in it resistance. Since thermistor 78 is thermally isolated from heater 90 and thermistor 84 (by means of reduced thermal conductivity of the bottom wall 71 of the member 70 owing to its thinness (e.g., 0.020 inch)) it always operates at the temperature of the fluid so that a change in relative velocity produces no change in operating temperature or resistance of thermistor 78. Thus, with a change in relative velocity, there is an attendant change in the output from the bridge 102 as appearing at leads 116 and 118. This change in output from the bridge, of course, affects the signal being supplied through the feedback circuit comprising amplifier 120, lead 122, lead 132, and amplifier 134. The characteristics of the amplifiers 120 and 134 are chosen, using techniques well known in the art, such that the changed voltage applied to heater 90 through lead 152 is sufficient to return thermistor 84 of resistive unit 112 to its original operating temperature and thus return the bridge 102 to its original condition. The changed output from amplifier 134 will be supplied to meter 138 after passing through unit 136. Thus, the increased output from amplifier 134 which is necessary to increase the heat output from heater 90 so as to bring the thermistor 84 back to its original operating temperature will be a measure of the relative velocity between the surface 18 of hull 12 and the fluid. Meter 138 is calibrated to read this velocity directly.

The unit 136 includes a linearizer to simplify the calibration and reading of meter 138 and zero and full scale adjustments which may be set when the boat is stationary.

The bridge 102 is operated in an unbalanced condition because of the base signal supplied on lead 130 and fed to the heater 90. This signal is chosen such that a 5° F difference in operating temperature is maintained between the heated thermistor 84 and the reference thermistor 78 which operates at the temperature of the fluid. By means of the primary feedback circuit (as described above, including amplifier 120, leads 122 and 132, amplifier 134, and lead 152), for a given ocean temperature each thermistor will operate at a single temperature despite the increased drain of heat into the fluid with increased velocity. This feature can be a substantial benefit for a number of reasons, including the fact that commercially available thermistors have complex and non-uniform relationships between operating temperature and resistance.

As indicated above, in a simple analysis the presence of compensating thermistor 78 in the arm of bridge 102 opposed to that arm including sensing thermistor 84 should eliminate the effect of a change in fluid temperature upon the relative velocity reading, or, equivalently, upon the voltage $e_m$ supplied to the meter 138. In practice, however, there is found to be a small anomalous change in meter reading, at constant relative velocity, as the fluid temperature varies. This anomalous effect is illustrated in FIG. 3. The family of curves indicates the voltage $e_m$ which will be supplied to meter 138 at a number of velocities for a range of fluid (in this case the ocean) emperature, $T_0$. Ideally, of course, these curves should be horizontal so that the same voltage $e_m$ would obtain for a given velocity no matter what the ocean temperature, $T_0$.

The exact reasons for this anomalous temperature effect are varied and complex and many are second order effects whose magnitude is difficult to measure or estimate. Some of reasons for the effect shown in FIG. 3 are: heat leaks between the thermistors, poor common mode rejection ratios of various amplifier, non-exact tracking between the termistors (or other elements used to measure temperature), the temperature coefficient of thermal conductivity of the materials in the primary feedback network (described above), the temperature coefficient of thermal conductivity of the various insulation materials used between the thermally sensitive elements and the ambient, the temperature coefficient of resistivity of the resistive heater 90, the temperature coefficient of thermal conductivity of the water of fluid, a variation in density with temperature of fluid, electrical crosstalk in the measuring circuit, etc.

The analysis of these second order effects is further complicated by the fact that some of these sources of error can contribute to a positive slope for the curves of FIG. 3 while others can contribute to a negative slope. With the apparatus design described in detail herein, the ultimate slope is found to be positive as illustrated in FIG. 3. Correction for this anomalous temperature effect is provided in the form of a secondary feedback circuit as shown in FIG. 2.

The signal appearing between lead 118 and ground 104 (i.e., the signal cross the resistive unit 114 which includes the thermistor operating at the fluid temperature) is fed to amplifier 126 and then through resistive network 128 to the summing point 124. As with the primary feedback network, the output from the summing point is fed through lead 132 to amplifier 134. The output from amplifier 134 is fed to both meter 138 (through unit 136) and heater 90 (via lead 152). The characteristics of amplifier 126 and resistive circuit 128 are chosen such that the signal supplied to summing point 124 on lead 154 is $e = -m T_0$ where $m$ is the slope of the curves in FIG. 3. This signal, therefore, compensates for the non-horizontal aspect of the curves of FIG. 3 and provides a velocity reading which is independent of fluid temperature.

An additional benefit of the secondary feedback loop is that for the small added expense of providing a meter (meter 148 in FIG. 4) the fluid temperature $T_0$ can be read directly.

In the circuit diagram of FIG. 4, switch 156 is provided which controls a relay 159 to switch in different gain adjustment and zero adjustment resistors in the situation where there are both starboard and port probes with slight variations between them. Potentiometer 160 is provided in amplifier circuit 126 for zeroing since the bridge 102 does not give zero voltage output at the zero degrees F. The value of 250 microfarads for capacitor 146 in the feedback loop of the first stage of amplifier 134 provides a phase lead compensation to make up for the long time delay in the thermal feedback path. There is typically a three second phase lag in the thermal feedback path and the chosen value for capacitor 146 introduces approximately a three second phase lead, thus allowing much higher gains and much better temperature regulation to be achieved without the thermal system becoming unstable.

As described above, the outer surface 72 of wall 71 of member 70 is smooth, one piece, and flush with the adjacent exterior surfaces of the boat (i.e., surface 18 of hull 12, surface 74 of fitting 14 and surface 76 of housing portion 28). This unitary construction having an extremely flat surface has been found to be most advantageous. Various benefits, achieved from this arrangement, include: there is no pressure drop caused by the transducer (i.e., the probe) when the apparatus is used as a flowmeter; there is no drag caused by the transducer when the apparatus is used on a boat as a speedometer; there is no turbulence produced which might affect the accuracy of the relative velocity reading; there is diminished possibility of damage to the probe; there is diminished probability of fouling; and the accuracy of relative velocity readings are increased substantially. Relative to the last mentioned advantage, it has been determined experimentally that surface irregularities can produce errors in the velocity reading of as much as 0.25 knot per 0.001 inch at velocities in the range of 0 to 12 knots.

Also determined to be of great significance is the spacing of any irregularities from the location where the predominant heat transfer from the probe to the fluid occurs. Thus, for example, a 0.10 inch misalignment of surfaces 74 and 76 may introduce less error than 0.001 inch irregularity on surface 72 in the area of wall 71 where portion 88 of mass 86 is secured thereto. For this reason, in the preferred design of the apparatus according to the present invention thermistor 84, copper mass 86 with connecting portion 88 are spaced apart from the edges of the smooth, one-piece circular wall 71 and the circular member 70 is of substantially greater size than the area of contact between portion 88 and member 70. With this design, even if difficulties are encountered in making surfaces 18, 74, 76 and 72 precisely flush, very accurate readings can be obtained if the surface 72 is itself unbroken and otherwise smooth.

In the embodiment illustrated in FIG. 1, it is assumed that the hull 12 is constructed from an insulating material. For boats having hulls which are good thermal conductors (e.g., aluminum) the throughhull fitting 14 may be eliminated and the thermistor 78 and copper mass 86 mounted directly upon a reduced thickness portion(s) of the hull. This same general arrangement is the most practical form for a flow meter constructed according to the present invention, in which the transducer unit would comprise a short length of pipe which could be inserted into the fluid conduit and which has a reduced thickness portion in which the thermistors would be mounted.

In the embodiment of FIG. 1, the plug 58 may be inserted into fitting 14 to seal it when the probe 10 is removed for repair, replacement, cleaning, etc.

While a particular embodiment of the invention has been described in detail, it will be apparent that other embodiments are within the scope of the invention and the following claims.

What is claimed is:

1. For use on a hulled boat, a marine speedometer comprising a probe including a smooth, one-piece metal member having an outer surface with a first predetermined area flush with the adjacent outer surface of said hull; a metallic mass secured in thermal contact to the inner surface of said member, the area of contact of said member and said mass being a second predetermined area less than said first predetermined area; a first thermistor device secured in thermal contact to said metallic mass; a second thermistor device secured in thermal contact to said member and being in thermal separation from said first thermistor device; a heater secured in thermal contact to said metallic mass; and electrical circuitry including a linear bridge network having said first thermistor device connected into a first arm thereof and said second thermistor device connected into a second arm thereof; a first feedback network including means to supply said heater with a first voltage proportional to the voltage developed across said linear bridge network; a second feedback network comprising means to supply said heater with a second voltage proportional to the voltage developed across said second thermistor device; and meter means connected to indicate a quantity proportional to the summation of said first and second voltages.

* * * * *